Patented July 23, 1946

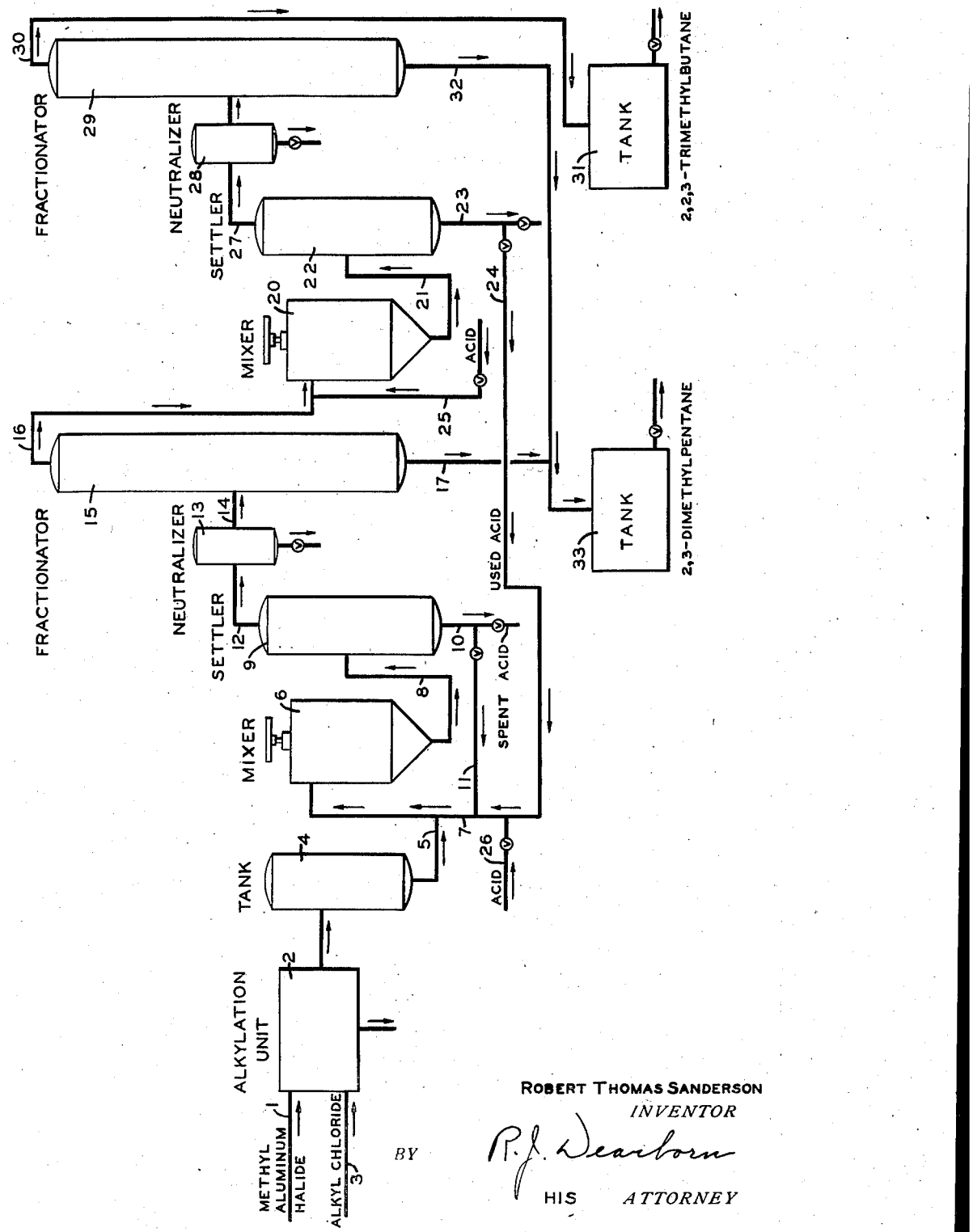

2,404,661

UNITED STATES PATENT OFFICE 2,404,661

MANUFACTURE OF MOTOR FUEL

Robert Thomas Sanderson, Beacon, N. Y., assignor to The Texas Company, New York, N. Y., a corporation of Delaware Application August 15, 1942, Serial No. 454,970

5 Claims. (Cl. 260—676)

This invention relates to the manufacture of motor fuel and particularly to motor fuel rich in branched chain hydrocarbons.

The invention has to do with obtaining 2,2,3-trimethylbutane from a mixture comprising the trimethylbutane and its isomer 2,4-dimethylpentane by a process involving treating the mixture with sulfuric acid under conditions such that 2,4-dimethylpentane undergoes conversion into 2,3-dimethylpentane, and distilling a fraction rich in 2,2,3-trimethylbutane from the treated hydrocarbon mixture. Advantageously, the treatment of the hydrocarbon mixture is effected with concentrated sulfuric acid at a temperature in the range about 70 to 125° F. The acid treated mixture is subsequently treated with alkali prior to distillation for the purpose of removing traces of acid remaining in the hydrocarbons.

The hydrocarbon 2,2,3-trimethylbutane boils at a temperature of about 178° F. while the isomer 2,4-dimethylpentane boils at a temperature of about 177° F. In the catalytic preparation of 2,2,3-trimethylbutane relatively large amounts of the isomer may be present. The isomer 2,4-dimethylpentane has a C. F. R. M. octane value of about 82 or thereabouts, whereas 2,2,3-trimethylbutane has a materially higher octane value. For this reason it is frequently desirable to produce the trimethylbutane in as concentrated form as possible for the purpose of making high octane motor fuel. Due to the similarity in boiling temperatures, however, this separation cannot be effected by conventional fractional distillation methods.

It has been found that concentrated sulfuric acid at temperatures in the range about 70 to 125° F. exerts no substantial effect upon 2,2,3-trimethylbutane, but under the same conditions does effect substantial conversion of 2,4-dimethylpentane into 2,3-dimethylpentane which has a materially higher boiling point, namely, about 194° F. Consequently, the acid treated hydrocarbon mixture can be subjected to fractional distillation and thereby effect removal of the more volatile hydrocarbons from the higher boiling and less valuable hydrocarbon. For example, by subjecting 2,4-dimethylpentane to the action of 95% $H_2SO_4$ at a temperature of about 120° F. for a period of 2 hours some 15% or more of the hydrocarbon is converted to 2,3-dimethylpentane. The acid treatment apparently causes isomerization of the 2,4-dimethylpentane.

Mixtures of the trimethylbutane and its isomer 2,4-dimethylpentane may be obtained by various methods of organo metallic synthesis. They may be obtained in processes of isomerization and alkylation and by cross polymerization with subsequent hydrogenation and synthesis through organo metallic compounds.

One procedure for the catalytic preparation of 2,2,3-trimethylbutane involves reacting a methyl aluminum halide with an alkyl halide as described in my pending application, Serial No. 452,698, filed July 29, 1942, for improvements in Organic synthesis.

As therein disclosed methyl aluminum chloride or other alkyl aluminum halide is placed or formed in a suitable reaction vessel, and an aliphatic halide such as 2-chloro-2,3-dimethylbutane is introduced slowly, advantageously in the form of a solution in 2,3-dimethylbutane. This solution containing about 12 to 15% of the chlorodimethylbutane is added over a period of about 3 hours, while maintaining a reaction temperature in the range about minus 58° to 32° F. The total solution added amounts to about 15 to 20 parts by weight per part of methyl aluminum chloride.

As previously intimated other methods of preparing branched chain hydrocarbon mixtures containing 2,2,3-trimethylbutane and 2,4-dimethylpentane may be employed.

In any case, the synthetic hydrocarbon mixture is subsequently treated with concentrated acid and thereafter distilled in accordance with the method of this invention so as to obtain a hydrocarbon product rich in 2,2,3-trimethylbutane.

Reference will now be made to the accompanying drawing illustrating one method of flow which may be employed in practicing the invention.

In the drawing methyl aluminum chloride from a source not shown is introduced through a pipe 1 to an alkylation unit 2. A solution of 2-chloro-2,3-dimethylbutane is introduced from a source not shown through a pipe 3 to the unit 2. The charge materials are thus subjected to reaction in the unit 2 so as to produce a hydrocarbon product containing 2,2,3-trimethylbutane and 2,4-dimethylpentane.

The hydrocarbon mixture is accumulated in a tank 4 from which it may be conducted through a pipe 5 to a mixer 6 wherein it is brought into contact with concentrated sulfuric acid introduced through a pipe 7. This acid may have a concentration of about 94% to 100% or more of $H_2SO_4$, and preferably a concentration of about 97% $H_2SO_4$.

The mixture of acid and hydrocarbons is subjected to thorough agitation in the mixer 6 while maintained at a temperature of about 70 to 125° F. over a period of about 20 minutes to 3 hours.

The products of reaction are drawn off through a pipe 8 to a settler 9 wherein separation into hydrocarbon and acid phases respectively occurs.

The acid phase is drawn off from the bottom of the settler through a pipe 10 and may be discharged all or in part from the system as spent acid. On the other hand at least a portion of it may be passed through a pipe 11 communicating with the previously mentioned pipe 7 whereby it is recycled to the mixer 6 for use in treating further feed hydrocarbon.

The hydrocarbon phase is drawn off from the settler through a pipe 12 to a neutralizing vessel 13 wherein it may be treated with alkali for the purpose of removing remaining acid therefrom. The neutralized hydrocarbons are then passed through a pipe 14 to a fractionator 15. The fractionator 15 is operated so as to separate from the hydrocarbon mixture a distillate fraction containing 2,2,3-trimethylbutane and unreacted 2,4-dimethylpentane. This distillate fraction is discharged from the fractionator through a pipe 16. The residual fraction removed from the bottom of the fractionator through a pipe 17 comprises 2,3-dimethylpentane.

The distillate fraction removed through the pipe 16 may still contain a relatively large amount of 2,4-dimethylpentane and further conversion of this material into the higher boiling 2,3-dimethylpentane may be effected by recycling to the mixer 6. Instead of recycling to the mixer 6 it is advantageous to pass the hydrocarbon mixture to a separate stage. Thus, the hydrocarbons are passed through the pipe 16 to a second mixer 20 which may be similar to the mixer 6 and wherein the hydrocarbons are again brought into contact with concentrated sulfuric acid under substantially similar conditions so as to effect further conversion of the 2,4-dimethylpentane into 2,3-dimethylpentane.

The reaction mixture is subsequently passed through a pipe 21 to a settler 22 wherein the hydrocarbon phase is separated from the acid phase.

The acid phase is drawn off through a pipe 23 and may be discharged all or in part from the system. Advantageously, however, this acid is conducted through a pipe 24 communicating with the previously mentioned pipe 7 wherein it is recycled to the mixer 6 of the primary stage. In this type of operation fresh acid may be introduced to the secondary stage through the pipe 25 while used acid removed from the secondary stage settler 22 is used solely or largely as the reagent in the primary stage mixer 6. In this way a countercurrent treatment between acid and hydrocarbons is utilized.

Where the used acid is not so recycled from the secondary stage or only returned in part, fresh acid may be passed directly from a pipe 26 to the primary stage mixer 6.

The hydrocarbon phase is drawn off from the settler 22 through a pipe 27 to a neutralizer 28 wherein the remaining acid is removed from the hydrocarbons.

The neutralized hydrocarbons are then passed to a fractionator 29 operated in a similar manner to the fractionator 15.

The distillate fraction rich in 2,2,3-trimethylbutane is drawn off through a pipe 30 to a tank 31.

The liquid fraction comprising 2,3-dimethyl- pentane drawn off from the fractionator 29 through a pipe 32 may be conducted together with the hydrocarbon drawn off through the pipe 17 to a tank 33.

The liquid fraction comprising 2,3-dimethylpentane drawn off from the fractionator 29 through a pipe 32 may be conducted together with the hydrocarbon drawn off through the pipe 17 to a tank 33.

The above described method of flow comprises a two-stage operation. However, it is contemplated that any number of stages may be used or instead a single stage may be used as already intimated. Moreover, the conditions of acid treatment may vary from stage to stage with respect to acid concentration, temperature and time of contact.

Obviously many modifications and variations of the invention, as hereinbefore set forth, may be made without departing from the spirit and scope thereof, and therefore only such limitations should be imposed as are indicated in the appended claims.

I claim:

1. The method of removing 2,4-dimethylpentane from a mixture comprising 2,4-dimethylpentane and 2,2,3-trimethylbutane, which comprises subjecting said mixture to the action of concentrated sulfuric acid at a temperature in the range about 70 to 125° F. for a period of time less than about 3 hours, such that 2,4-dimethylpentane undergoes substantial conversion into 2,3-dimethylpentane while 2,2,3-trimethylbutane remains substantially unchanged, removing acid from the treated hydrocarbon mixture, and distilling a fraction enriched in 2,2,3-trimethylbutane from the treated hydrocarbon mixture, the remaining hydrocarbons comprising 2,3-dimethylpentane.

2. In the manufacture of 2,2,3-trimethylbutane, the steps comprising forming a hydrocarbon mixture containing 2,2,3-trimethylbutane and its isomer 2,4-dimethylpentane, treating the hydrocarbon mixture with sulfuric acid at a temperature in the range about 70 to 125° F. for a period of time less than about 3 hours, such that 2,4-dimethylpentane undergoes substantial conversion into 2,3-dimethylpentane while 2,2,3-trimethylbutane remains substantially unchanged, removing acid from the treated hydrocarbon mixture, and distilling a fraction enriched in 2,2,3-trimethylbutane from the treated hydrocarbon mixture, the remaining hydrocarbons comprising 2,3-dimethylpentane.

3. In the manufacture of 2,2,3-trimethylbutane, the steps comprising reacting a methyl aluminum halide with alkyl halide in solution in an alkane corresponding to the alkyl radical of said alkyl halide such that a branched chain hydrocarbon product comprising 2,2,3-trimethylbutane and 2,4-dimethylpentane is obtained, treating said product with sulfuric acid at a temperature in the range about 70 to 125° F. for a period of time less than about 3 hours, such that 2,4-dimethylpentane undergoes substantial conversion into 2,3-dimethylpentane while 2,2,3-trimethylbutane remains substantially unchanged, removing acid from the treated hydrocarbon mixture, and distilling a fraction enriched in 2,2,3-trimethylbutane from the treated hydrocarbon mixture, the remaining hydrocarbons comprising 2,3-dimethylpentane.

4. In the manufacture of 2,2,3-trimethylbutane, the steps comprising reacting a methyl aluminum halide with alkyl halide in solution in an alkane corresponding to the alkyl radical of said alkyl halide at a temperature in the range about minus 58 to 32° F. such that a branched chain hydrocarbon product comprising 2,2,3-trimethylbutane and 2,4-dimethylpentane is obtained, treating said product with sulfuric acid at a temperature in the range about 70 to 125° F. for a period of time less than about 3 hours, such that 2,4-dimethylpentane undergoes substantial conversion into 2,3-dimethylpentane while 2,2,3-trimethylbutane remains substantially unchanged, removing acid from the treated hydrocarbon mixture, and distilling a fraction enriched in 2,2,3-trimethylbutane from the treated hydrocarbon mixture, the remaining hydrocarbons comprising 2,3-dimethylpentane.

5. In the manufacture of 2,2,3-trimethylbutane, the steps comprising reacting methyl aluminum chloride with 2-chloro-2,3-dimethylbutane in solution in 2,3-dimethylbutane at a temperature in the range about minus 58 to 32° F. such that a branched chain hydrocarbon product comprising 2,2,3-trimethylbutane and 2,4-dimethylpentane is obtained, treating said product with sulfuric acid at a temperature in the range about 70 to 125° F. for a period of time less than about 3 hours such that 2,4-dimethylpentane undergoes substantial conversion into 2,3-dimethylpentane while 2,2,3-trimethylbutane remains substantially unchanged, removing acid from the treated hydrocarbon mixture, and distilling a fraction enriched in 2,2,3-trimethylbutane from the treated hydrocarbon mixture, the remaining hydrocarbons comprising 2,3-dimethylpentane.

ROBERT THOMAS SANDERSON.